(12) United States Patent
Yang et al.

(10) Patent No.: US 11,307,692 B2
(45) Date of Patent: Apr. 19, 2022

(54) DISPLAY DEVICE

(71) Applicant: Samsung Display Co., Ltd., Yongin-si (KR)

(72) Inventors: Sung-Jin Yang, Cheonan-si (KR); Taeik Kim, Asan-si (KR); Hyunsik Park, Cheonan-si (KR); Chungi You, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/911,829

(22) Filed: Jun. 25, 2020

(65) Prior Publication Data

US 2021/0048905 A1    Feb. 18, 2021

(30) Foreign Application Priority Data

Aug. 14, 2019    (KR) ........................ 10-2019-0099430

(51) Int. Cl.
    *G06F 3/041*      (2006.01)
    *G06F 3/044*      (2006.01)

(52) U.S. Cl.
    CPC .......... *G06F 3/0412* (2013.01); *G06F 3/0444* (2019.05); *G06F 3/0445* (2019.05)

(58) Field of Classification Search
    CPC .... G06F 3/0412; G06F 3/0444; G06F 3/0445; G06F 3/0446; G06F 3/04164
    See application file for complete search history.

(56) References Cited

U.S. PATENT DOCUMENTS

| | | | |
|---|---|---|---|
| 2011/0057893 A1 | 3/2011 | Kim et al. | |
| 2014/0055702 A1* | 2/2014 | Park | H01L 27/3279 349/43 |
| 2014/0192278 A1* | 7/2014 | Esaka | G06F 3/0446 349/12 |
| 2017/0115805 A1* | 4/2017 | Chiang | G06F 3/0445 |
| 2017/0336907 A1* | 11/2017 | Jeong | G06F 3/0443 |
| 2018/0101270 A1* | 4/2018 | Cho | G06F 3/0412 |
| 2018/0188584 A1* | 7/2018 | Yeh | G02F 1/1337 |

FOREIGN PATENT DOCUMENTS

| | | |
|---|---|---|
| KR | 10-1082293 B1 | 11/2011 |
| KR | 10-2015-0028472 A | 3/2015 |
| KR | 10-2015-0062528 A | 6/2015 |
| KR | 10-1666593 B1 | 10/2016 |

* cited by examiner

*Primary Examiner* — Md Saiful A Siddiqui
(74) *Attorney, Agent, or Firm* — Lewis Roca Rothgerber Christie LLP

(57) ABSTRACT

A display device includes a display panel and an input sensing panel. The input sensing panel may include a base layer, a plurality of sensing electrodes, sensing lines, and sensing pads. Each of the sensing lines may include a transparent conductive line on the base layer, a metal line directly on the transparent conductive line, and an insulation layer covering the metal line. Openings may be defined in at least one of the metal line and the transparent conductive line.

18 Claims, 10 Drawing Sheets

DISPLAY DEVICE

CROSS-REFERENCE TO RELATED APPLICATION

This application claims priority to and the benefit of Korean Patent Application No. 10-2019-0099430, filed on Aug. 14, 2019 in the Korean Intellectual Property Office, the entire content of which is hereby incorporated by reference.

BACKGROUND

1. Field

Aspects of embodiments of the present disclosure relate to a display device.

2. Description of the Related Art

A display device may include a display panel for displaying an image and an input sensing panel for detecting an external input. The input sensing panel may be integrated with the display panel through a continuous process. Alternatively, the input sensing panel may be provided through a process separate from the display panel, and then coupled to the display panel. When light is incident to the input sensing panel from the outside, diffused reflection may be generated at a stepped portion of a metal line of a sensing line, and the sensing line may be seen from the outside.

SUMMARY

According to an aspect of embodiments of the present disclosure, a display device having improved visibility is provided.

According to one or more embodiments of the inventive concept, a display device includes: a display panel; and an input sensing panel on the display panel and including an active area and a peripheral area adjacent to the active area. The input sensing panel includes: a base layer; a plurality of sensing electrodes arranged in the active area and on the base layer; a plurality of sensing lines arranged in the peripheral area, on the base layer, and electrically connected to the plurality of sensing electrodes; and a plurality of sensing pads arranged in the peripheral area, on the base layer, and electrically connected to the plurality of sensing lines. Each of the plurality of sensing lines includes: a transparent conductive line on the base layer; a metal line directly on the transparent conductive line; and an insulation layer configured to cover the metal line. A plurality of openings are defined in at least one of the metal line and the transparent conductive line.

In an embodiment, the metal line may extend in a first direction, and the plurality of openings may be defined in the metal line, extend in the first direction, and be spaced apart from each other in a second direction crossing the first direction.

In an embodiment, the metal line may include a first area having a first width and a second area having a second width less than the first width, and a number of the plurality of openings defined in the first area may be greater than that of the plurality of openings defined in the second area.

In an embodiment, the metal line may have an area less than that of the transparent conductive line.

In an embodiment, the metal line may have a flat top surface.

In an embodiment, the transparent conductive line may have a maximum width greater than that of the metal line.

In an embodiment, the plurality of openings may include a plurality of first openings and a plurality of second openings, the plurality of first openings may be defined in the metal line, and the plurality of second openings may be defined in the transparent conductive line and overlap the plurality of first openings on a plane.

In an embodiment, each of the plurality of first openings may have a width greater than that of each of the plurality of second openings.

In an embodiment, the metal line may have an area less than that of the transparent conductive line.

In an embodiment, a portion of the plurality of sensing lines may include a first area having a first width and a second area having a second width less than the first width, a number of the plurality of first openings overlapping the first area may be greater than that of the plurality of first openings overlapping the second area, and a number of the plurality of second openings overlapping the first area may be greater than that of the plurality of second openings overlapping the second area.

In an embodiment, the transparent conductive line may extend in a first direction, and the plurality of openings may be defined in the transparent conductive line, extend in the first direction, and be spaced apart from each other in a second direction crossing the first direction.

In an embodiment, the metal line may overlap the plurality of openings on a plane.

In an embodiment, the metal line may cover the transparent conductive line.

In an embodiment, the transparent conductive line may include a first area having a first width and a second area having a second width less than the first width, and a number of the plurality of openings defined in the first area may be greater than that of the plurality of openings defined in the second area.

In an embodiment, the transparent conductive line may include an indium-tin oxide.

In an embodiment, the metal line may include molybdenum.

In an embodiment, the metal line may have a thickness greater than that of the transparent conductive line.

In an embodiment, the plurality of sensing electrodes may include a first sensing electrode and a second sensing electrode, the first sensing electrode may include a plurality of first sensing patterns and at least one first connection pattern connecting two first sensing patterns, which are adjacent to each other, of the plurality of first sensing patterns, the second sensing electrode may include a plurality of second sensing patterns and at least one second connection pattern connecting two second sensing patterns, which are adjacent to each other, of the plurality of second sensing patterns, and the first connection pattern and the second connection pattern may be on different layers from each other.

In an embodiment, the input sensing panel may further include a sensing insulation layer between the first connection pattern and the second connection pattern.

In an embodiment, the sensing insulation layer may not overlap the transparent conductive line.

BRIEF DESCRIPTION OF THE FIGURES

The accompanying drawings are included to provide a further understanding of the inventive concept, and are incorporated in and constitute a part of this specification.

The drawings illustrate some example embodiments of the inventive concept and, together with the description, serve to explain principles of the inventive concept. In the drawings.

DETAILED DESCRIPTION

Figure 1:
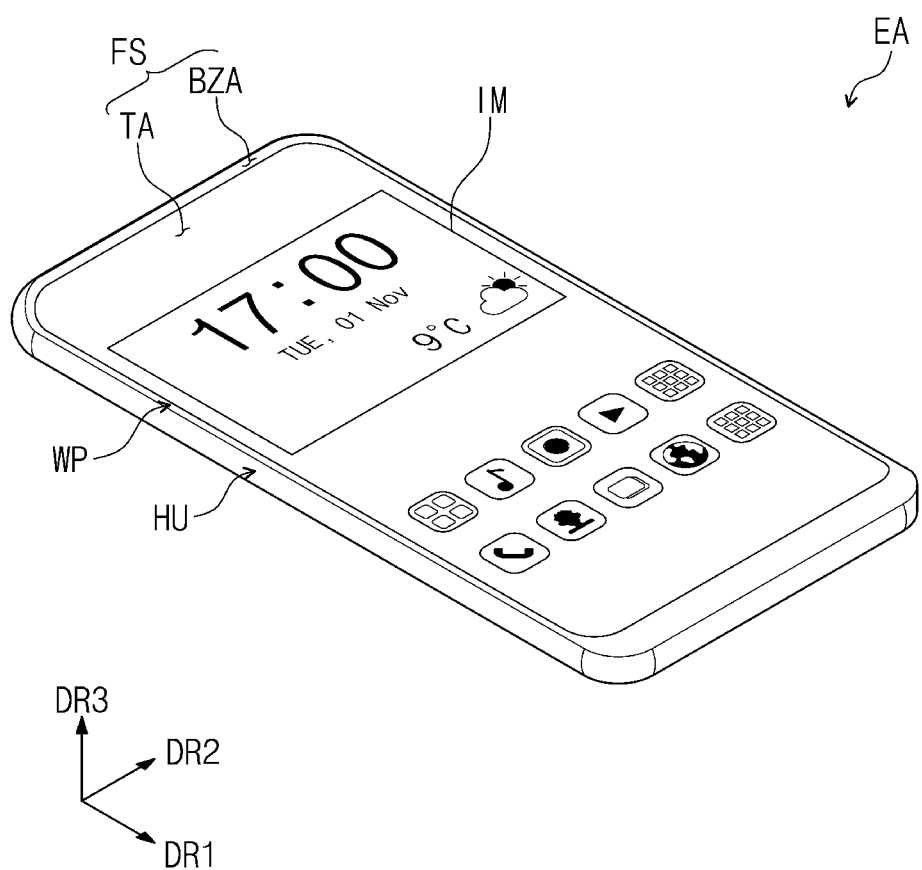
FIG. 1 is a perspective view illustrating a display device according to an embodiment of the inventive concept.

The inventive concepts now will be described more fully herein with reference to the accompanying drawings, in which various embodiments are shown. The inventive concepts may, however, be embodied in many different forms, and should not be construed as limited to the embodiments set forth herein. Rather, these embodiments are provided so that this disclosure will be thorough and complete, and will fully convey the scope of the inventive concepts to those skilled in the art. Like reference numerals refer to like elements throughout.

In this specification, it is also to be understood that when one component (or region, layer, portion, etc.) is referred to as being "on," "connected to," or "coupled to" another component, it may be directly disposed/connected/coupled on/to the one component, or one or more intervening third components may also be present.

Like reference numerals refer to like elements throughout. Also, in the figures, the thickness, ratio, and dimensions of components may be exaggerated for clarity of illustration.

The term "and/or" includes any and all combinations of one or more of the associated listed items.

It is to be understood that although terms such as "first" and "second" are used herein to describe various elements, these elements should not be limited by these terms. The terms are used to distinguish one component from other components. For example, a first element referred to as a "first" element in one embodiment may be referred to as a "second" element in another embodiment without departing from the scope of the claims. The terms of a singular form may include plural forms unless referred to the contrary.

Also, "under," "below," "above," "upper," and the like are used for explaining relation association of components illustrated in the drawings. However, the terms may be a relative concept and described based on directions expressed in the drawings. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

"About" or "approximately" as used herein are inclusive of the stated value and mean within an acceptable range of deviation for the particular value as determined by one of ordinary skill in the art, considering the measurement in question and the error associated with measurement of the particular quantity (e.g., the limitations of the measurement system).

Unless otherwise defined, all terms (including technical and scientific terms) used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

The meaning of "include" or "comprise" specifies a property, a fixed number, a step, an operation, an element, a component, or a combination thereof, but does not exclude other properties, fixed numbers, steps, operations, elements, components, or combinations thereof.

Herein, some example embodiments of the inventive concept will be described with reference to the accompanying drawings.

Figure 2:
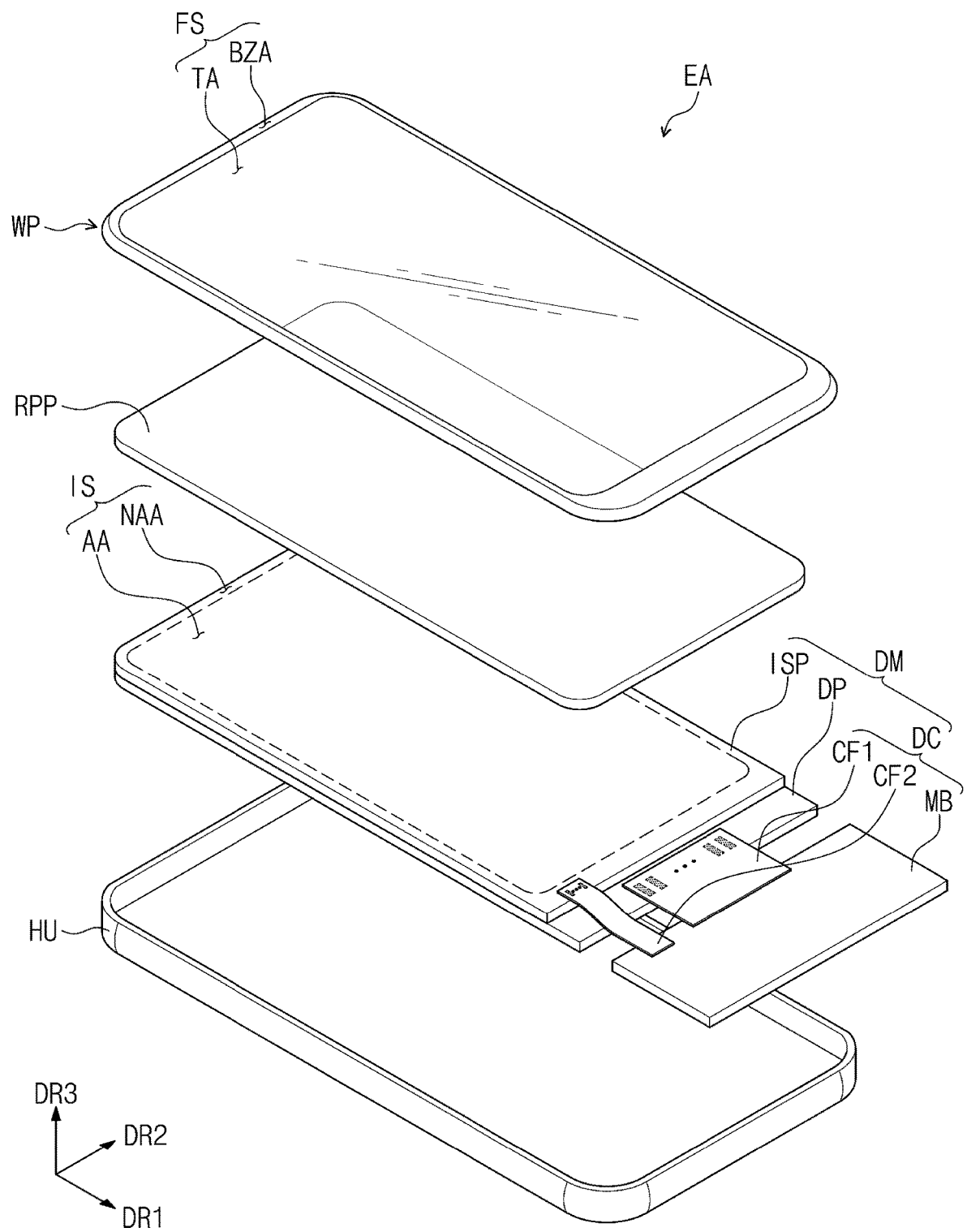
FIG. 2 is an exploded perspective view illustrating the display device according to an embodiment of the inventive concept.

FIG. 1 is a perspective view illustrating a display device according to an embodiment of the inventive concept; and FIG. 2 is an exploded perspective view illustrating the display device according to an embodiment of the inventive concept.

Referring to FIGS. 1 and 2, a display device EA may be activated according to an electrical signal. The display device EA may include any of various embodiments. For example, the display device EA may be used for large-sized display devices, such as televisions, monitors, or outdoor advertisement boards, and small and medium-sized display devices, such as personal computers, notebook computers, personal digital terminals, navigation units for vehicles, game consoles, portable electronic devices, and cameras. Also, the above-described devices are provided merely as example embodiments, and, thus, the display device EA may be adopted for other display devices without departing from the spirit and scope of the inventive concept. In an embodiment, the display device EA is illustrated as a smartphone, as an example.

The display device EA may display an image IM on a display surface FS, which is parallel to each of a first direction DR1 and a second direction DR2, toward a third direction DR3. The image IM may include a dynamic image and/or a static image. In FIG. 1, a clock and icons are illustrated as an example of the image IM. The display surface FS on which the image IM is displayed may correspond to each of a front surface of the display device EA and a front surface of a window panel WP.

In an embodiment, a front surface (or top surface) and a rear surface (or bottom surface) of each of members are defined on the basis of a direction of displaying the image IM. The front surface and the rear surface may be opposite to each other in the third direction DR3, and a normal direction of each of the front surface and the rear surface may be parallel to the third direction DR3. Also, directions indicated by the first to third directions DR1, DR2, and DR3 are a relative concept and may be converted with respect to each other. In this specification, an expression of "on a plane" may represent a feature when viewed in the third direction DR3.

The display device EA may include a window panel WP, an anti-reflection panel RPP, a display module DM, and a housing HU. In an embodiment, the window panel WP and the housing HU may be coupled to provide an external appearance of the display device EA.

The window panel WP may include an optically transparent insulating material. For example, the window panel WP may include glass or plastic. The window panel WP may have a single-layer or multi-layer structure. For example, the window panel WP may include a plurality of plastic films coupled by an adhesive agent, or a glass substrate and a plastic film coupled by an adhesive agent.

The display surface FS of the window panel WP may define the front surface of the display device EA as described above. A transmission area TA may be an optically transparent area. For example, the transmission area TA may have a visible light transmittance of about 90% or more.

A bezel area BZA may have a relatively lower light transmittance than that of the transmission area TA. The bezel area BZA may define a shape of the transmission area TA. In an embodiment, the bezel area BZA may be disposed adjacent to the transmission area TA to surround the transmission area TA.

The bezel area BZA may have a color (e.g., a predetermined color). The bezel area BZA may cover a peripheral area NAA of the display module DM to prevent or substantially prevent the peripheral area NAA from being seen from the outside. However, embodiments of the inventive concept are not limited thereto. For example, in the window panel WP according to an embodiment of the inventive concept, the bezel area BZA may be omitted.

The anti-reflection panel RPP may be disposed below the window panel WP. The anti-reflection panel RPP may decrease a reflectance of external light incident from above the window panel WP. The anti-reflection panel RPP according to an embodiment of the inventive concept may be omitted, or contained in the display module DM.

In an embodiment, the display module DM may display an image IM and detect an external input. The display module DM may include a front surface IS including an active area AA and the peripheral area NAA. The active area AA may be activated according to an electrical signal.

In an embodiment, the active area AA may be an area in which the image IM is displayed, and, also, an area in which an external input is detected. The transmission area TA may overlap the active area AA. For example, the transmission area TA may overlap all or at least a portion of the active area AA. Thus, a user may see the image IM or provide an external input through the transmission area TA. However, this is intended to be illustrative only. For example, the display module DM according to an embodiment of the inventive concept may include the active area AA that is separated into or includes an area in which the image IM is displayed and an area in which an external input is detected. However, embodiments of the inventive concept are not limited thereto.

The peripheral area NAA may be covered by the bezel area BZA. The peripheral area NAA may be adjacent to the active area AA. In an embodiment, the peripheral area NAA may surround the active area AA. In the peripheral area NAA, a driving line or a driving circuit for driving the active area AA may be disposed.

In an embodiment, the display module DM may include a display panel DP, an input sensing panel ISP, and a driving circuit DC.

The display panel DP may be a component that substantially generates the image IM. The image IM generated by the display panel DP may be seen by the user from the outside through the transmission area TA.

The input sensing panel ISP may provide an external input applied from the outside. As described above, the input sensing panel ISP may detect an external input provided to the window panel WP.

The driving circuit DC may electrically connect the display panel DP and the input sensing panel ISP. In an embodiment, the driving circuit DC may include a main circuit board MB, a first circuit board CF1, and a second circuit board CF2.

The first circuit board CF1 may be electrically connected with the display panel DP. The first circuit board CF1 may connect the display panel DP and the main circuit board MB. The first circuit board CF1 according to an embodiment is illustrated as a flexible circuit film. However, this is intended to be illustrative only. For example, the first circuit board CF1 according to an embodiment of the inventive concept may not be connected to the main circuit board MB, and the first circuit board CF1 may be a rigid board.

In an embodiment, the first circuit board CF1 may be connected to pads (display pads) of the display panel DP, which are disposed in the peripheral area NAA. The first circuit board CF1 may provide an electrical signal for driving the display panel DP to the display panel DP. The electrical signal may be generated from the first circuit board CF1 or the main circuit board MB.

The second circuit board CF2 may be electrically connected with the input sensing panel ISP. The second circuit board CF2 may connect the input sensing panel ISP and the main circuit board MB. The second circuit board CF2 according to an embodiment is illustrated as a flexible circuit film. However, this is intended to be illustrative only. For example, the second circuit board CF2 according to an embodiment of the inventive concept may not be connected to the main circuit board MB, and the second circuit board CF2 may be a rigid board.

In an embodiment, the second circuit board CF2 may be connected to pads (display pads) of the input sensing panel ISP, which are disposed in the peripheral area NAA. The second circuit board CF2 may provide an electrical signal for driving the input sensing panel ISP to the input sensing panel ISP. The electrical signal may be generated from the second circuit board CF2 or the main circuit board MB.

The main circuit board MB may include any of various kinds of driving circuits for driving the display module DM or a connector for power supply. Each of the first circuit board CF1 and the second circuit board CF2 may be connected to the main circuit board MB. The display module according to an embodiment of the inventive concept may easily control the display module DM through one main circuit board MB. However, this is intended to be illustrative only. For example, in the display module DM according to an embodiment of the inventive concept, the display panel DP and the input sensing panel ISP may be connected to different main circuit boards, respectively, and one of the first circuit board CF1 and the second circuit board CF2 may not be connected to the main circuit board MB. However, embodiments of the inventive concept are not limited thereto.

The housing HU may be coupled with the window panel WP. The housing HU may be coupled with the window panel WP to provide an inner space (e.g., a predetermined inner space). The display module DM may be accommodated in the inner space.

The housing HU may include a material having a relatively high strength. For example, the housing HU may include a plurality of frames and/or plates, which include or are made of glass, plastic, metal, or a combination thereof. The housing HU may stably protect components of the display device EA accommodated in the inner space from an external impact.

Figure 3A:
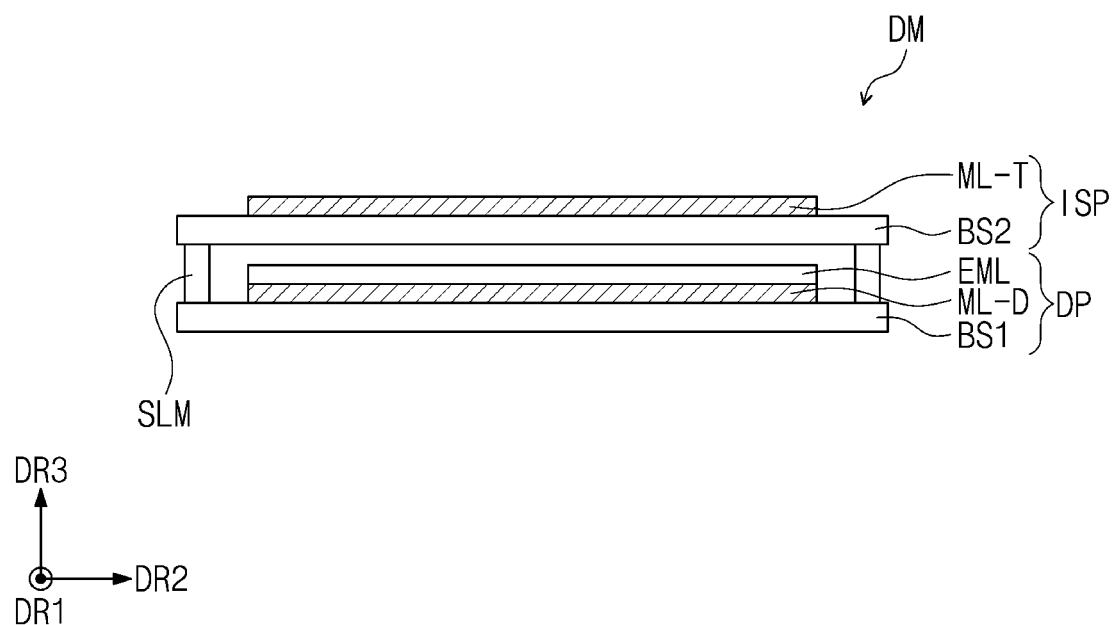
FIGS. 3A and 3B are cross-sectional views illustrating a display module according to embodiments of the inventive concept.

FIG. 3A is a cross-sectional view illustrating a display module according to an embodiment of the inventive concept.

Referring to FIG. 3A, in an embodiment, the display module DM may include a display panel DP, an input sensing panel ISP, and a coupling member SLM.

In an embodiment, the display panel DP may include a first base layer BS1, a display circuit layer ML-D, and an image realization layer EML. The input sensing panel ISP may include a second base layer BS2 and a sensing circuit layer ML-T.

In an embodiment, each of the first base layer BS1 and the second base layer BS2 may be a laminated structure including a silicon substrate, a plastic substrate, a glass substrate, an insulation film, or a plurality of insulation layers.

The display circuit layer ML-D may be disposed on the first base layer BS1. The display circuit layer ML-D may include a plurality of insulation layers, a plurality of conductive layers, and a semiconductor layer. The plurality of conductive layers of the display circuit layer ML-D may constitute signal lines or a control circuit of a pixel.

The image realization layer EML may be disposed on the display circuit layer ML-D. In an embodiment, the image realization layer EML may include organic light emitting diodes. However, this is intended to be illustrative only. For example, the image realization layer EML according to an embodiment of the inventive concept may include inorganic light emitting diodes, organic-inorganic light emitting diodes, or a liquid crystal layer.

The second base layer BS2 may be disposed on the image realization layer EML. In an embodiment, a space (e.g., a predetermined space) may be defined between the second base layer BS2 and the image realization layer EML. In an embodiment, the space may be filled with air or inert gases. In an embodiment of the inventive concept, the space may be filled with a filling material, such as a silicon-based polymer, an epoxy-based resin, or an acrylic-based resin.

The sensing circuit layer ML-T may be disposed on the second base layer BS2. In an embodiment, the sensing circuit layer ML-T may include a plurality of insulation layers and a plurality of conductive layers. The plurality of conductive layers may constitute sensing electrodes for detecting an external input, sensing lines electrically connected to the sensing electrodes, and sensing pads electrically connected to the sensing lines. This will be described further later.

The coupling member SLM may be disposed between the first base layer BS1 and the second base layer BS2. The coupling member SLM may couple the first base layer BS1 and the second base layer BS2. The coupling member SLM may include an organic material, such as a photo-curable resin or a photo-setting resin, or an inorganic material, such as a frit seal. However, embodiments of the inventive concept are not limited thereto.

Figure 3B:
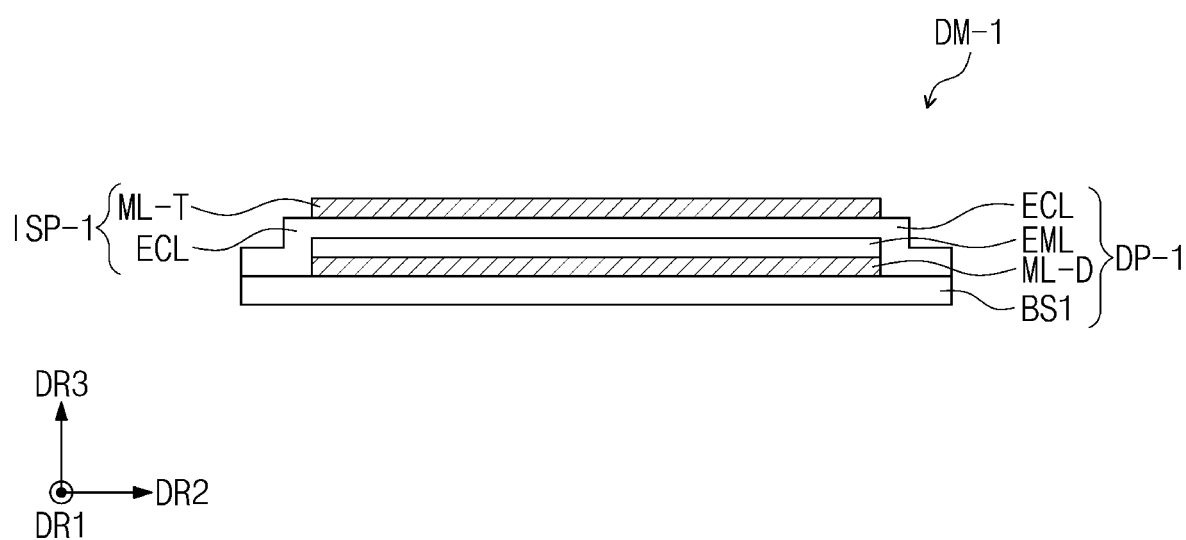

FIG. 3B is a cross-sectional view illustrating a display module according to an embodiment of the inventive concept.

Referring to FIG. 3B, a display module DM-1 may include a display panel DP-1 and an input sensing panel ISP-1. The input sensing panel ISP-1 may be referred to as an input sensing layer.

The display panel DP-1 may include a base layer BS1, a display circuit layer ML-D, an image realization layer EML, and a thin-film encapsulation layer ECL. The input sensing panel ISP-1 may include a second base layer ECL and a sensing circuit layer ML-T. The thin-film encapsulation layer ECL and the second base layer ECL may be the same component.

According to an embodiment of the inventive concept, the display panel DP-1 and the input sensing panel ISP-1 may be provided through a continuous process. That is, the sensing circuit layer ML-T may be directly provided on the thin-film encapsulation layer ECL.

Figure 4:
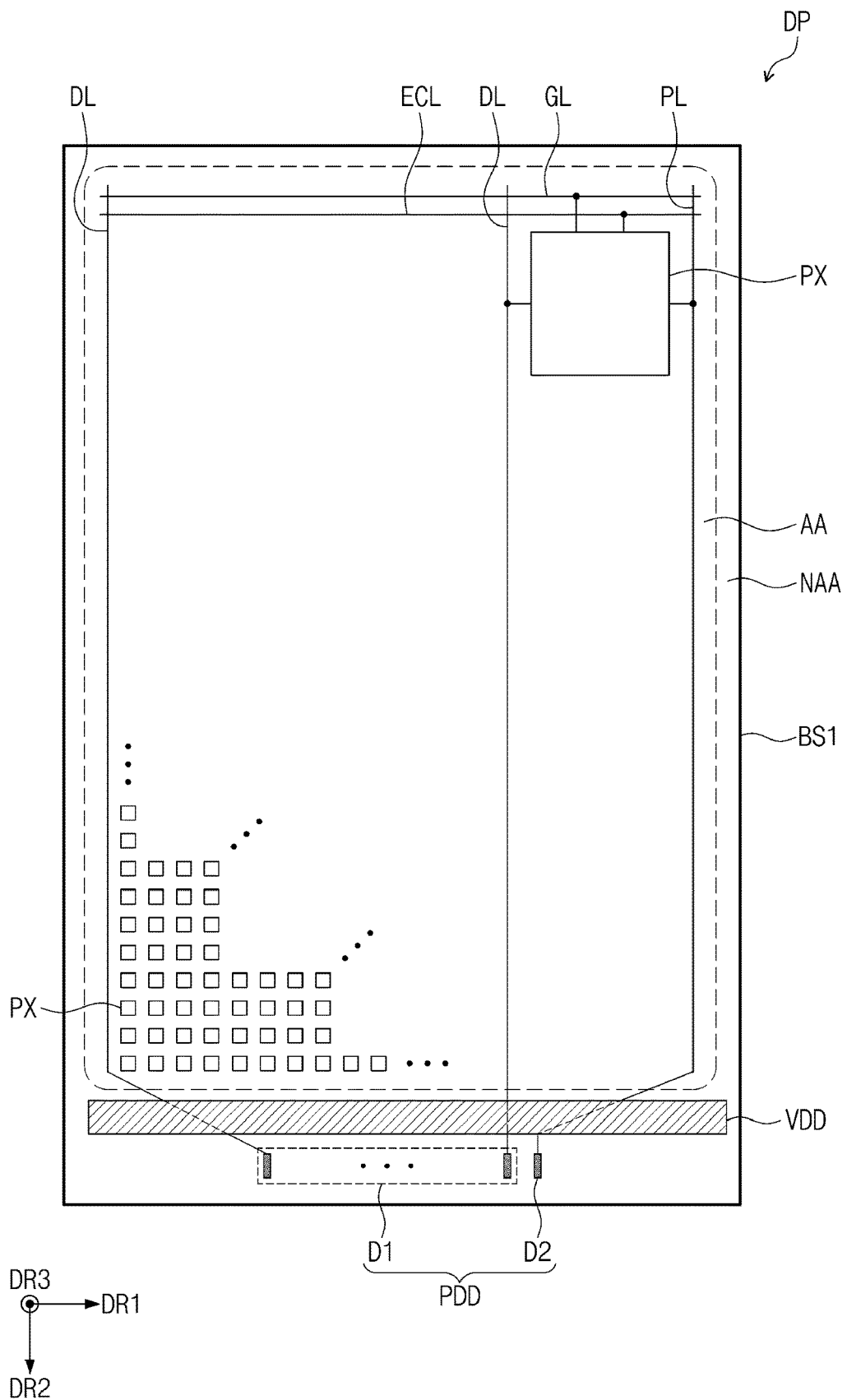
FIG. 4 is a plan view illustrating a display panel according to an embodiment of the inventive concept.

FIG. 4 is a plan view illustrating a display panel according to an embodiment of the inventive concept.

Referring to FIG. 4, the display panel DP may include a plurality of pixels PX, a plurality of signal lines GL, DL, PL, and ECL, and a plurality of display pads PDD.

The display panel DP may have the active area AA in which an image is displayed and the peripheral area NAA in which a driving circuit or a driving line is disposed. In FIG. 4, the active area AA and the peripheral area NAA of the display panel DP are displayed. In the active area AA, the plurality of pixels PX may be disposed.

The plurality of signal lines GL, DL, PL, and ECL may be connected to the pixels PX to transmit an electrical signal to the pixels PX. A scan line GL, a data line DL, a power line PL, and a light emitting control line ECL of the signal lines contained in the display panel DP are illustrated as an example. However, this is intended to be illustrative only. For example, the signal lines according to an embodiment of the inventive concept may further include an initialization voltage line. However, embodiments of the inventive concept are not limited thereto.

In an embodiment, a power pattern VDD may be disposed in the peripheral area NAA. The power pattern VDD may be connected to a plurality of power lines PL. Thus, as the display panel DP includes the power pattern VDD, a same first power signal may be provided to the plurality of pixels.

The display pads PDD may include a first pad D1 and a second pad D2. The first pad D1 may be provided in plural, and a plurality of first pads D1 may be connected to the data lines DL, respectively. The second pad D2 may be connected to the power pattern VDD and electrically connected to the power line PL. The display panel DP may provide electrical signals, which are provided from the outside through the display pads PDD, to the pixels PX. In an embodiment, the display pads PDD may further include pads for receiving other electrical signals in addition to the first pad D1 and the second pad D2. However, embodiments of the inventive concept are not limited thereto.

Figure 5:
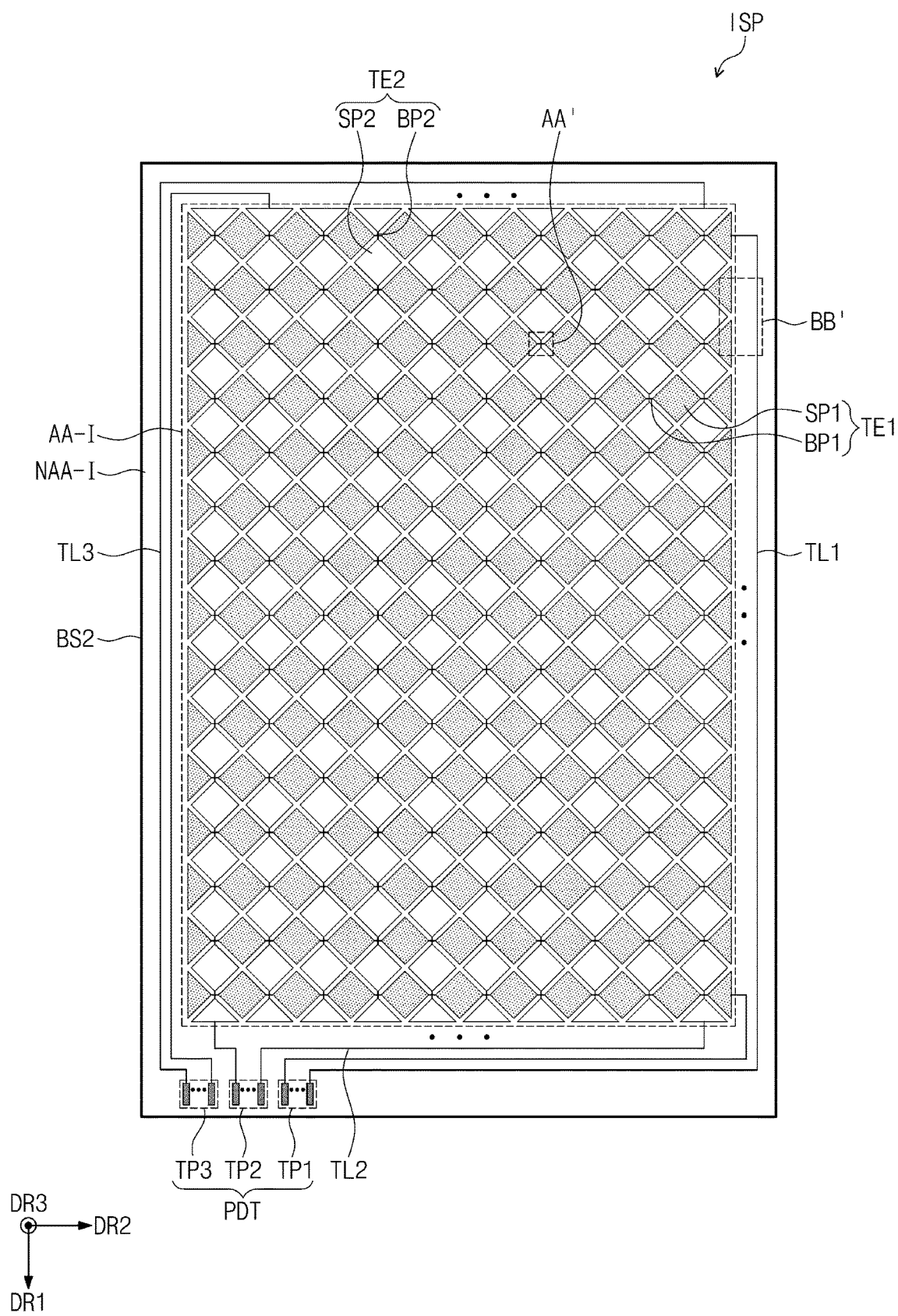
FIG. 5 is a plan view illustrating an input sensing panel according to an embodiment of the inventive concept.

FIG. 5 is a plan view illustrating an input sensing panel according to an embodiment of the inventive concept.

Referring to FIG. 5, the input sensing panel ISP may include the second base layer BS2, a plurality of sensing electrodes TE1 and TE2, a plurality of sensing lines TL1, TL2, and TL3, and a plurality of sensing pads PDT. The plurality of sensing electrodes TE1 and TE2, the plurality of sensing lines TL1, TL2, and TL3, and the plurality of sensing pads PDT may constitute the sensing circuit layer ML-T (refer to FIGS. 3A and 3B).

On the second base layer BS2, an active area AA-I and a peripheral area NAA-I adjacent to the active area AA-I may be defined. In an embodiment, the peripheral area NAA-I may surround the active area AA-I.

The plurality of sensing electrodes TE1 and TE2 may include a first sensing electrode TE1 and a second sensing electrode TE2. The first sensing electrode TE1 and the second sensing electrode TE2 may be disposed on the active area AA-I. In an embodiment, the input sensing panel ISP may obtain information of an external input through a variation of a capacitance between the first sensing electrode TE1 and the second sensing electrode TE2.

The first sensing electrode TE1 may include first sensing patterns SP1 and first connection patterns BP1. At least one first connection pattern BP1 may be connected to two first sensing patterns SP1, which are adjacent to each other. The second sensing electrode TE2 may include second sensing patterns SP2 and second connection patterns BP2. At least one second connection pattern BP2 may be connected to two second sensing patterns SP2, which are adjacent to each other.

The sensing lines TL1, TL2, and TL3 may be disposed in the peripheral area NAA-I. The sensing lines TL1, TL2, and TL3 may include a first sensing line TL1, a second sensing line TL2, and a third sensing line TL3.

The first sensing line TL1 may be connected to the first sensing electrode TE1. The second sensing line TL2 may be connected to an end of the second sensing electrode TE2. The third sensing line TL3 may be connected to another end of the second sensing electrode TE2. The another end of the second sensing electrode TE2 may be opposite to the one end of the second sensing electrode TE2.

The second sensing electrode TE2 according to an embodiment of the inventive concept may be connected to the second sensing line TL2 and the third sensing line TL3. Thus, the second sensing electrode TE2 having a greater length than the first sensing electrode TE1 may uniformly maintain a sensitivity according to an area. However, this is intended to be illustrative only. For example, the third sensing line TL3 according to an embodiment of the inventive concept may be omitted. However, embodiments of the inventive concept are not limited thereto.

The sensing pads PDT may be disposed in the peripheral area NAA-I. The sensing pads PDT may include a first sensing pad TP1, a second sensing pad TP2, and a third sensing pad TP3. The first sensing pad TP1 may be connected to the first sensing line TL1 and electrically connected to the first sensing electrode TE1. The second sensing pad TP2 may be connected to the second sensing line TL2. The third sensing pad TP3 may be connected to the third sensing line TL3. Thus, the second sensing pad TP2 and the third sensing pad TP3 may be electrically connected to the second sensing electrode TE2.

In an embodiment, the first sensing line TL1 may have a first width less than a second width of the first sensing pad TP1. The second sensing line TL2 may have a first width less than a second width of the second sensing pad TP2. The third sensing line TL3 may have a first width less than a second width of the third sensing pad TP3.

Figure 6:
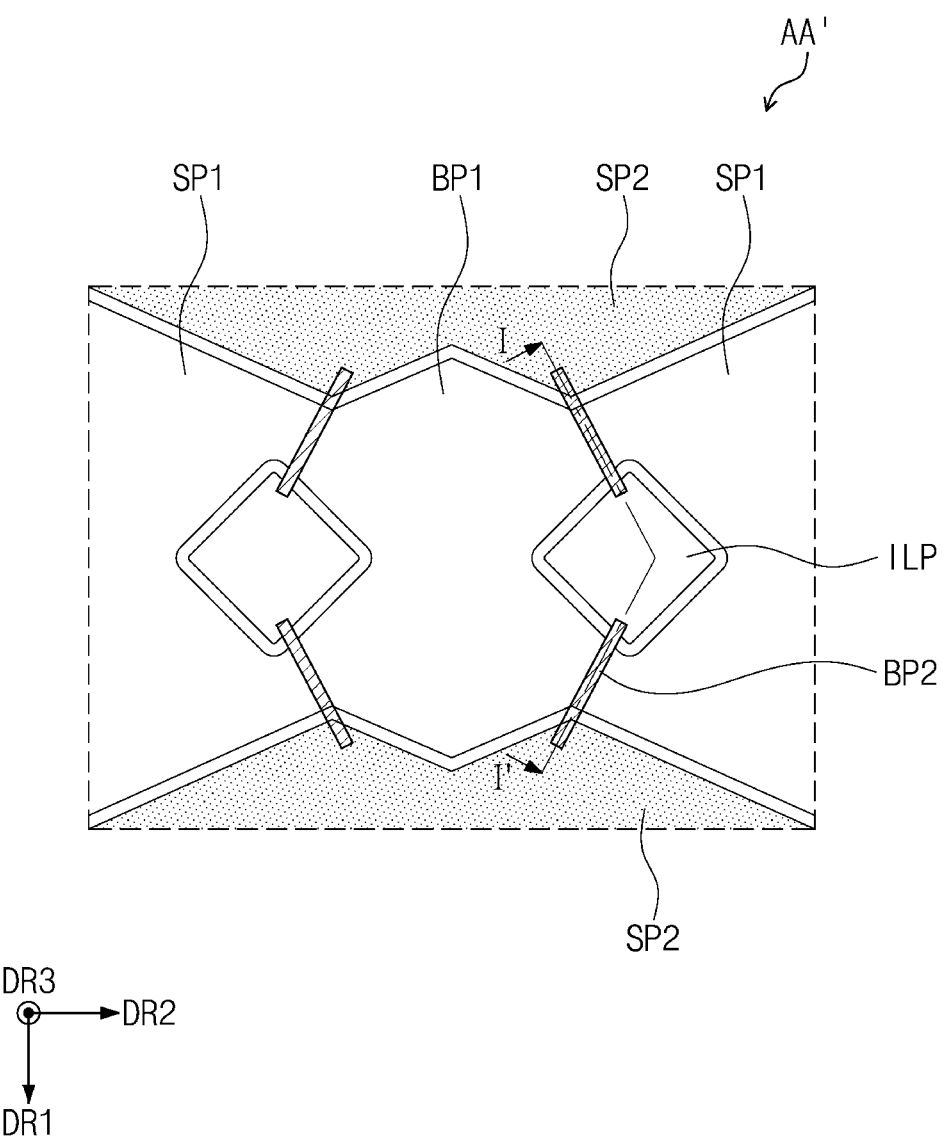
FIG. 6 is an enlarged plan view illustrating a region AA' of FIG. 5 according to an embodiment of the inventive concept.
Figure 7:
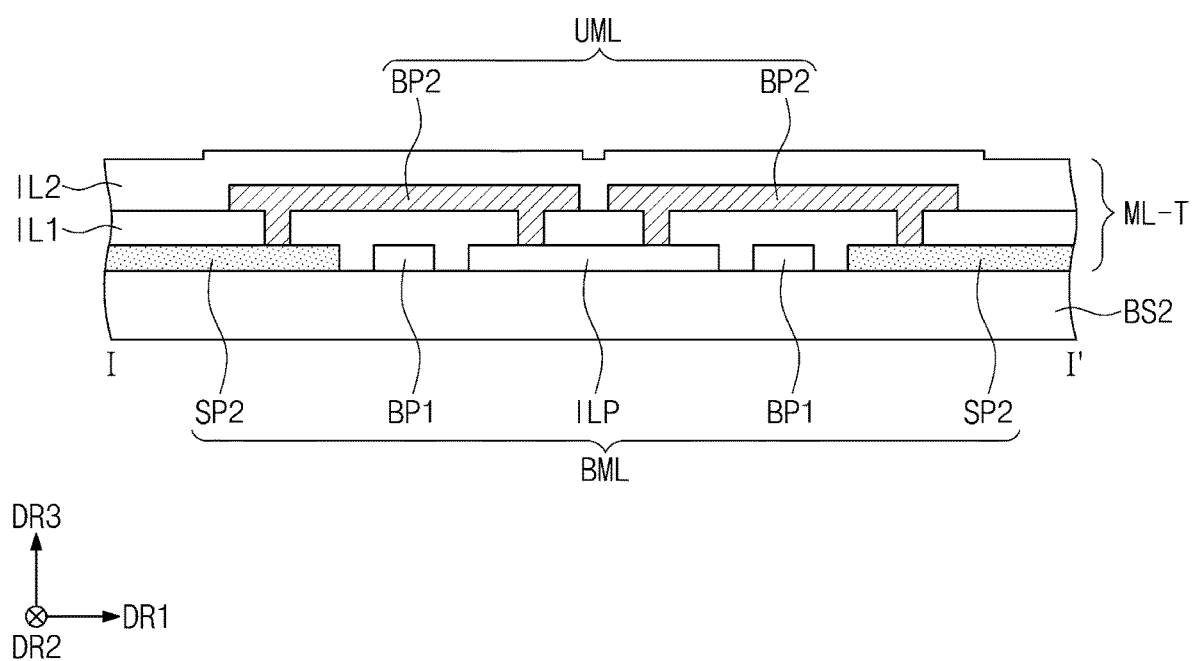
FIG. 7 is a cross-sectional view taken along the line I-I' of FIG. 6 according to an embodiment of the inventive concept.

FIG. 6 is an enlarged plan view illustrating a region AA' of FIG. 5 according to an embodiment of the inventive concept; and FIG. 7 is a cross-sectional view taken along the line I-I' of FIG. 6 according to an embodiment of the inventive concept.

Referring to FIGS. 6 and 7, the sensing circuit layer ML-T may be disposed on the second base layer BS2. The sensing circuit layer ML-T may include a first conductive layer BML, a sensing insulation layer IL1 disposed on the first conductive layer BML, a second conductive layer UML disposed on the sensing insulation layer IL1, and an insulation layer IL2 disposed on the second conductive layer UML.

The first conductive layer BML may include a transparent conductive material. In this specification, a feature of being transparent may represent that a light transmittance is equal to or greater than a predetermined reference. For example, although the predetermined reference may be about 90%, embodiments of the inventive concept are not limited thereto. In an embodiment, the first conductive layer BML may include any of a transparent conductive oxide, e.g., at least one of an indium-tin oxide (ITO), an indium-zinc-oxide (IZO), an indium-gallium oxide (IGO), an indium-zinc-gallium oxide (IGZO), and a mixture/compound thereof. However, embodiments of the inventive concept are not limited thereto.

The first conductive layer BML may include first sensing patterns SP1, first connection patterns BP1, and second sensing patterns SP2. The first conductive layer BML may further include an island pattern ILP. The island pattern ILP may be insulated from the first sensing patterns SP1 and the first connection patterns BP1 and electrically connected to the second sensing patterns SP2.

The sensing insulation layer IL1 may cover the first conductive layer BML. In an embodiment, the sensing insulation layer IL1 may include an inorganic material. The inorganic material may include at least one of a silicon oxide, a silicon nitride, a silicon oxynitride, a titanium oxide, and an aluminum oxide.

In an embodiment, the second conductive layer UML may include an opaque conductive material. For example, the second conductive layer UML may include a metal material, e.g., molybdenum, silver, titanium, copper, aluminum, or an alloy thereof. The alloy may be, for example, molybdenum niobium.

The second conductive layer UML may include second connection patterns BP2. In an embodiment of the inventive concept, although four second connection patterns BP2 are shown, as an example, disposed to connect two second sensing patterns SP2, embodiments of the inventive concept are not limited thereto. Each of the second connection patterns BP2 may be connected to one second sensing pattern SP2 and the island pattern ILP. The two second sensing patterns SP2, which are spaced apart from each other, may be electrically connected to each other through the second connection patterns BP2 and the island pattern ILP.

The insulation layer IL2 may cover the second conductive layer UML. In an embodiment, the insulation layer IL2 may include an inorganic material, e.g., at least one of a silicon oxide, a silicon nitride, a silicon oxynitride, a titanium oxide, and an aluminum oxide.

Figure 8:
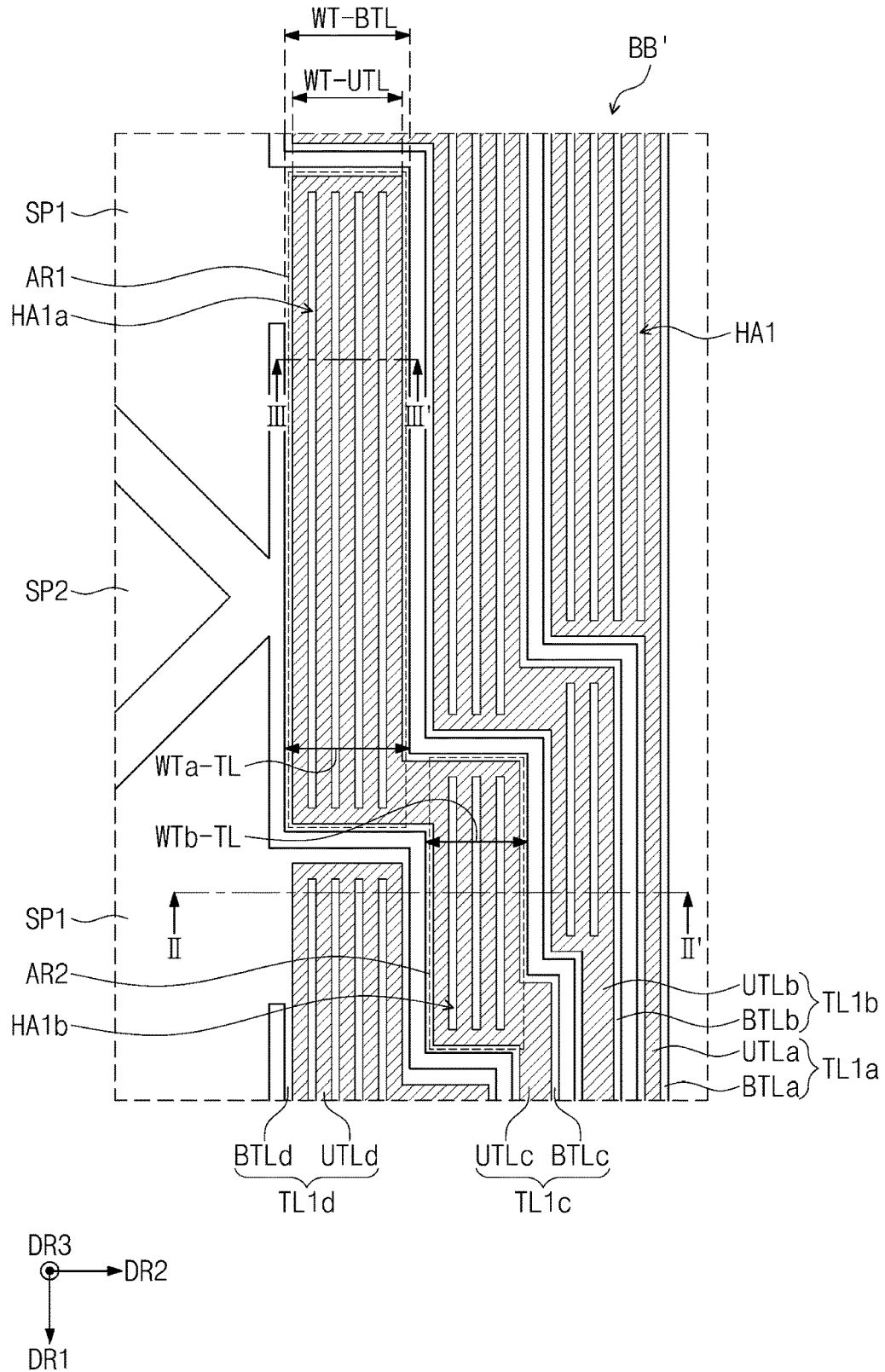
FIG. 8 is an enlarged plan view illustrating a region BB' of FIG. 5 according to an embodiment of the inventive concept.

FIG. 8 is an enlarged plan view illustrating a region BB' of FIG. 5 according to an embodiment of the inventive concept.

Referring to FIGS. 5 and 8, a portion of the first sensing lines TL1, which is connected to the first sensing patterns SP1, of the plurality of sensing lines TL1, TL2, and TL3 described through FIG. 5 is illustrated according to an embodiment. The first sensing lines TL1 may be connected to the first sensing patterns SP1, respectively. In an embodiment, the first sensing lines TL1 may include a first sensing line TL1a, a second sensing line TL1b, a third sensing line TL1c, and a fourth sensing line TL1d. Herein, the first to fourth sensing lines TL1a, TL1b, TL1c, and TL1d of the first sensing lines TL1 according to an embodiment of the inventive concept will be described. Also, although not shown, structures of the first to fourth sensing lines TL1a, TL1b, TL1c, and TL1d, which will be described below, may be applied to remaining sensing lines in the same manner.

In an embodiment, the first sensing line TL1a may include a first transparent conductive line BTLa and a first metal line UTLa.

The first transparent conductive line BTLa may be disposed on the second base layer BS2 (refer to FIG. 3). The first transparent conductive line BTLa may extend in the first direction DR1. The first transparent conductive line BTLa may include a transparent conductive material. In an embodiment, the first transparent conductive line BTLa may include a transparent conductive oxide, e.g., at least one of an indium-tin oxide (ITO), an indium-zinc-oxide (IZO), an indium-gallium oxide (IGO), an indium-zinc-gallium oxide (IGZO), and a mixture/compound thereof. However, embodiments of the inventive concept are not limited thereto. The first transparent conductive line BTLa may be electrically connected to a first sensing pattern SP1. The first transparent conductive line BTLa may be integrated with the first sensing pattern SP1.

The first metal line UTLa may be directly disposed on the first transparent conductive line BTLa. The first metal line UTLa may extend in the first direction DR1. The first metal line UTLa may include an opaque conductive material. For example, the first metal line UTLa may include a metal material, e.g., molybdenum, silver, titanium, copper, aluminum, or an alloy thereof. In an embodiment, the alloy may be, e.g., molybdenum niobium. The first metal line UTLa may be electrically connected to the first transparent conductive line BTLa. First openings HA1 may be defined in the first metal line UTLa. The first openings HA1 may each extend in the first direction DR1 and be spaced apart from each other in the second direction DR2.

The first metal line UTLa may have an area less than that of the first transparent conductive line BTLa.

The second sensing line TL1b may be disposed adjacent to the first sensing line TL1a. The second sensing line TL1b may include a second transparent conductive line BTLb and a second metal line UTLb.

In an embodiment, the second transparent conductive line BTLb may have substantially the same configuration as the first transparent conductive line BTLa, and the second metal line UTLb may have substantially the same configuration as the first metal line UTLa.

The third sensing line TL1c may be disposed adjacent to the second sensing line TL1b. The third sensing line TL1c may include a third transparent conductive line BTLc and a third metal line UTLc.

In an embodiment, the third transparent conductive line BTLc may have substantially the same configuration as the first transparent conductive line BTLa, and the third metal line UTLc may have substantially the same configuration as the first metal line UTLa.

The third metal line UTLc may include a first area AR1 having a first width WTa-TL and a second area AR2 having a second width WTb-TL, and the first width WTa-TL may be greater than the second width WTb-TL. In an embodiment, a number of first openings HA1a defined in the first area AR1 may be about four. However, this is intended to be illustrative only, and the embodiments of the inventive concept are not limited to the number of the first openings HA1a defined in the first area AR1. In an embodiment, a number of first openings HA1b defined in the second area AR2 may be about three. However, this is intended to be illustrative only, and the embodiments of the inventive concept are not limited to the number of the first openings HA1b defined in the second area AR2. In an embodiment, the number of the first openings HA1a defined in the first area AR1 may be greater than the number of the first openings HA1b defined in the second area AR2.

The third transparent conductive line BTLc may have a width WT-BTL greater than a width WT-UTL of the third metal line UTLc.

The above-described structure of the third sensing line TL1c may be applied to remaining sensing lines in the same manner.

The fourth sensing line TL1d may be disposed adjacent to the third sensing line TL1c. The fourth sensing line TL1d may include a fourth transparent conductive line BTLd and a fourth metal line UTLd.

In an embodiment, the fourth transparent conductive line BTLd may have substantially the same configuration as the first transparent conductive line BTLa, and the fourth metal line UTLd may have substantially the same configuration as the first metal line UTLa.

Figure 9:
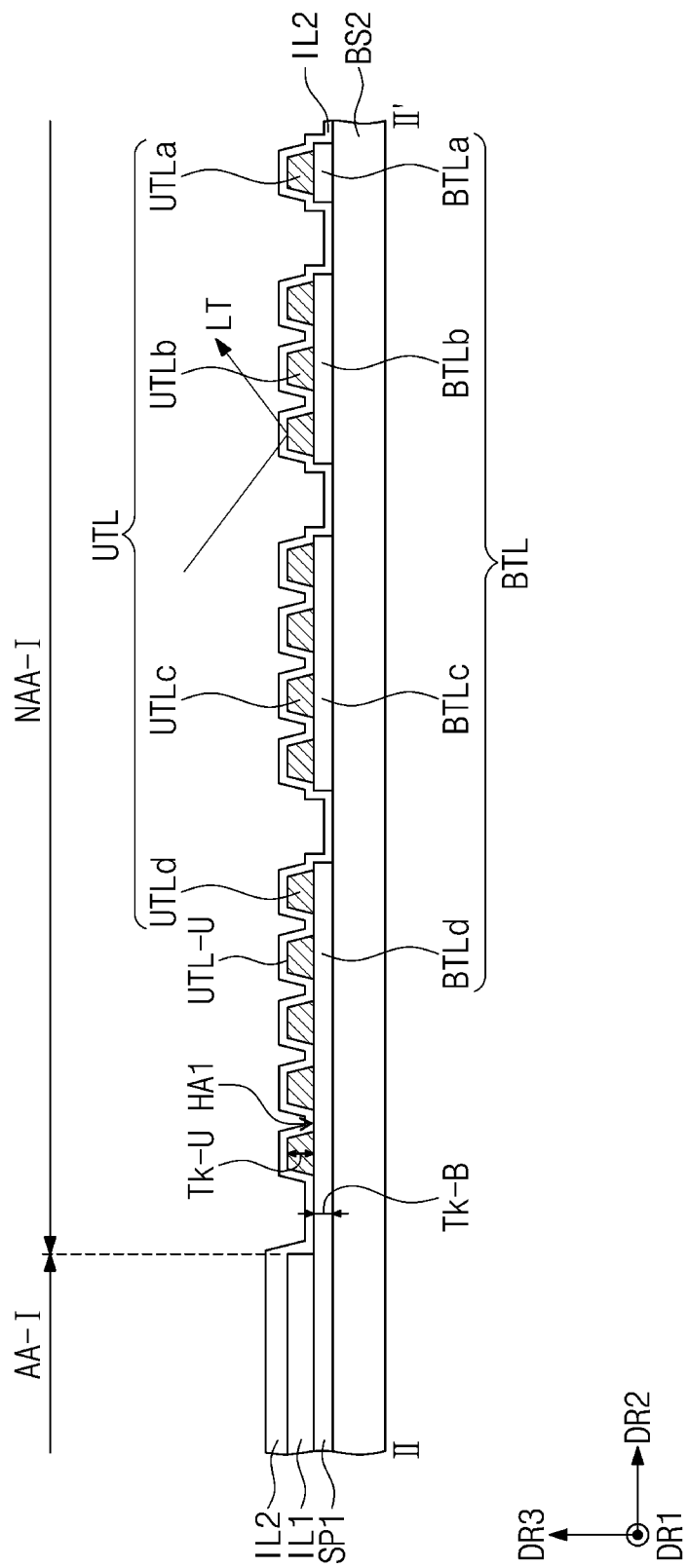
FIG. 9 is a cross-sectional view taken along the line II-II' of FIG. 8 according to an embodiment of the inventive concept.

FIG. 9 is a cross-sectional view taken along the line II-II' of FIG. 8 according to an embodiment of the inventive concept. The components described in FIG. 8 will be designated by the same reference symbols, and further description thereof will be omitted.

Referring to FIGS. 8 and 9, the first sensing pattern SP1 may be disposed on the second base layer BS2. The first sensing pattern SP1 may be disposed on the active area AA-I. The transparent conductive lines BTL may be disposed on the second base layer BS2. The transparent conductive lines BTL may be disposed on the peripheral area NAA-I.

The sensing insulation layer IL1 may be disposed on the first sensing pattern SP1. The sensing insulation layer IL1 may be disposed on the active area AA-I. In an embodiment, the sensing insulation layer IL1 may not overlap the peripheral area NAA-I. In an embodiment, the sensing insulation layer IL1 may not overlap the transparent conductive lines BTL. The metal lines UTL may be disposed on and directly contact the transparent conductive lines BTL in a one-to-one corresponding manner, respectively. The sensing insulation layer IL1 may not be disposed between the metal lines UTL and the transparent conductive lines BTL. Thus, a stepped portion due to the sensing insulation layer IL1 may not be generated at the metal lines UTL.

According to an embodiment of the inventive concept, each of the metal lines UTL may have a flat top surface UTL-U. Light LT incident into the display device EA (refer to FIG. 1) from the outside of the display device EA (refer to FIG. 1) may be reflected at the top surface UTL-U of each of the metal lines UTL. Since the top surface UTL-U of each of the metal lines UTL is flat, diffused reflection of the incident light LT may be prevented or substantially prevented from being generated, and the metal lines UTL may not be seen from the outside. Thus, the display device EA (refer to FIG. 1) having improved visibility may be provided.

The insulation layer IL2 may be disposed on the sensing insulation layer IL1. The insulation layer IL2 may cover the metal lines UTL.

According to an embodiment of the inventive concept, although at least a portion of the metal lines UTL may be exposed to the outside due to a scratch being generated in the insulation layer IL2 disposed on the peripheral area NAA-I during a process, the sensing lines TL1, TL2, and TL3 (refer to FIG. 5) may not be disconnected by the transparent conductive line BTL having great resistance to corrosion or oxidation, which is disposed below each of the metal lines UTL. Thus, the display device EA (refer to FIG. 1) having improved reliability may be provided.

The first to fourth sensing lines TL1a, TL1b, TL1c, and TL1d may be disposed on the peripheral area NAA-I. In an embodiment, each of the metal lines UTL may have a thickness TK-U greater than a thickness TK-B of each of the transparent conductive line BTL.

If a contact area between the transparent conductive lines BTL and the metal lines UTL is increased, the transparent conductive lines BTL and the metal lines UTL may not maintain an adhesive force therebetween to be detached from each other, and thus a layer delamination failure may be generated. The layer delamination failure may represent a phenomenon in which the metal lines UTL are separated from the transparent conductive lines BTL. However, according to embodiments of the inventive concept, as the first openings HA1 are defined in the metal lines UTL, the contact area between the transparent conductive lines BTL and the metal lines UTL may be provided to maintain the adhesive force. The number of the first openings HA1 defined in each of the metal lines UTL may be varied according to the width of each of the transparent conductive lines BTL, and the contact area between the transparent conductive lines BTL and the metal lines UTL may be controlled by the first openings HA1. Thus, a possibility of generation of layer delamination may decrease. Thus, the display device EA (refer to FIG. 1) having improved reliability may be provided.

Figure 10:
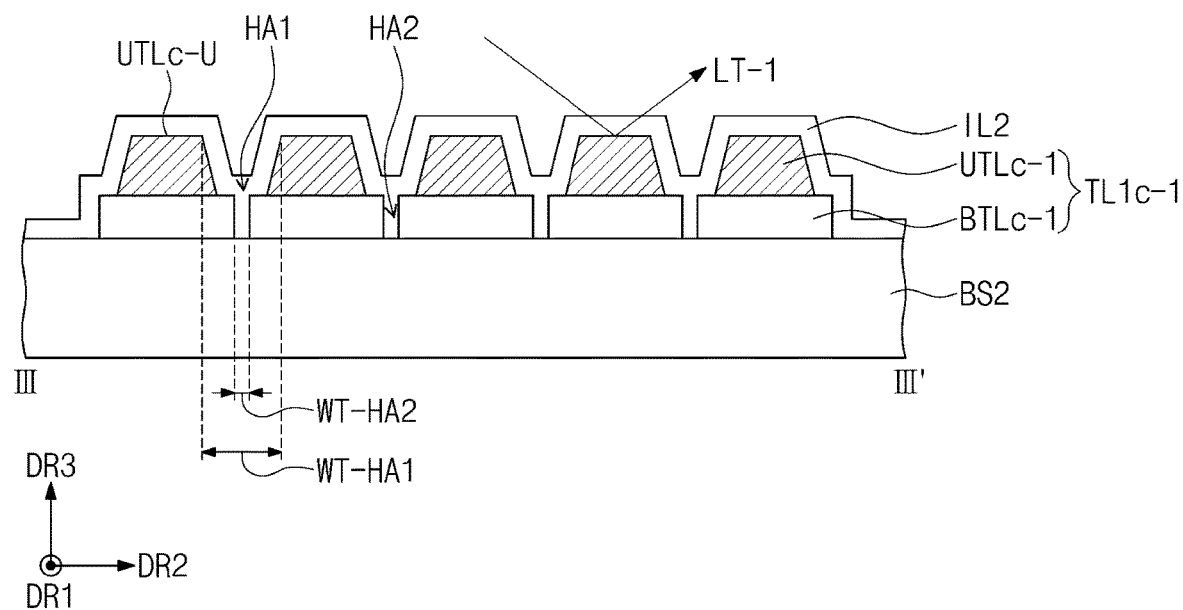
FIG. 10 is a cross-sectional view taken along the line III-III' of FIG. 8 according to an embodiment of the inventive concept.

FIG. 10 is a cross-sectional view taken along the line III-Ill' of FIG. 8 according to an embodiment of the inventive concept. The components described in FIG. 8 will be designated by the same reference symbols, and further description thereof will be omitted.

Referring to FIG. 10, a third transparent conductive line BTLc-1 of a third sensing line TL1c-1 may be disposed on the second base layer BS2, and a third metal line UTLc-1 of the third sensing line TL1c-1 may be disposed on the third transparent conductive line BTLc-1. The insulation layer IL2 may cover the third metal line UTLc-1.

The first openings HA1 may be defined in the third metal line UTLc-1. The first openings HA1 may each extend in the first direction DR1 and be spaced apart from each other in the second direction DR2.

Second openings HA2 may be defined in the third transparent conductive line BTLc-1. The second openings HA2 may each extend in the first direction DR1 and be spaced apart from each other in the second direction DR2. The second openings HA2 may overlap with the first openings HA1 on a plane, respectively. In an embodiment, each of the first openings HA1 may have a width WT-HA1 greater than a width WT-HA2 of each of the second openings HA2.

On the plane, the third metal line UTLc-1 may have an area less than that of the third transparent conductive line BTLc-1.

As the first openings HA1 are defined in the third metal line UTLc-1, a contact area between the third transparent conductive line BTLc-1 and the third metal line UTLc-1 may be provided to maintain an adhesive force therebetween. Thus, the display device EA (refer to FIG. 1) having improved reliability may be provided.

The third metal line UTLc-1 of the third sensing line TL1c-1 may have a flat top surface UTLc-U.

According to an embodiment of the inventive concept, light LT-1 incident into the display device EA (refer to FIG. 1) from the outside of the display device EA (refer to FIG. 1) may be reflected at the top surface UTLc-U of the third metal line UTLc-1. Since the top surface UTLc-U of each of the third metal lines UTLc-1 is flat, diffused reflection of the incident light LT-1 may be prevented or substantially prevented from being generated, and the third metal lines UTLc-1 may not be seen from the outside. Thus, the display device EA (refer to FIG. 1) having improved visibility may be provided.

Although the third sensing line TL1c-1 is illustrated in FIG. 10 as an example, embodiments of the inventive concept are not limited thereto. For example, the above-described structure of the third sensing line TL1c-1 may be applied to remaining sensing lines in the same manner.

Figure 11:
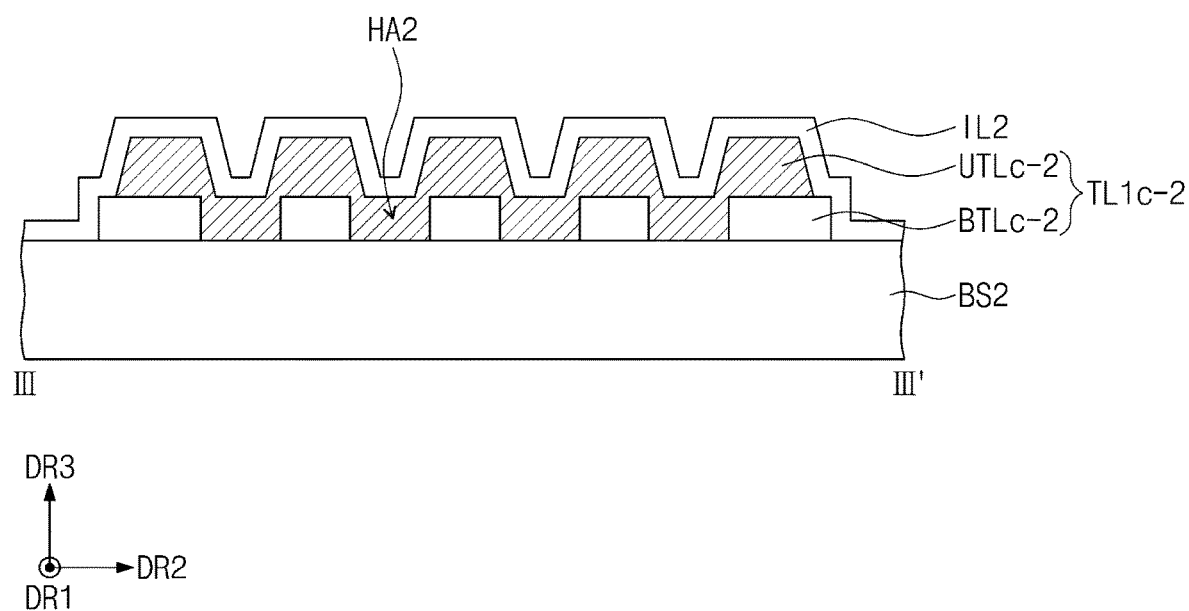
FIG. 11 is a cross-sectional view taken along the line III-III' of FIG. 8 according to an embodiment of the inventive concept.

FIG. 11 is a cross-sectional view taken along the line III-Ill' of FIG. 8 according to an embodiment of the inventive concept. The components described in FIG. 8 will be designated by the same reference symbols, and further description thereof will be omitted.

Referring to FIG. 11, a third transparent conductive line BTLc-2 of a third sensing line TL1c-2 may be disposed on the second base layer BS2, and a third metal line UTLc-2 of the of a third sensing line TL1c-2 may be disposed on the third transparent conductive line BTLc-2. The insulation layer IL2 may cover the third metal line UTLc-2.

The second openings HA2 may be defined in the third transparent conductive line BTLc-2. The second openings HA2 may each extend in the first direction DR1 and be spaced apart from each other in the second direction DR2. On a plane, the third metal line UTLc-2 may overlap the second openings HA2. The third metal line UTLc-2 may cover the third transparent conductive line BTLc-2.

On the plane, the third metal line UTLc-2 may have an area less than that of the third transparent conductive line BTLc-2.

On the plane, a portion of the third transparent conductive line BTLc-2 may include a first area having a first width and a second area having a second width. In an embodiment, a number of the second openings HA2 overlapping the first area may be greater than that of the second openings HA2 defined in the second area.

Although the third sensing line TL1c-2 is illustrated in FIG. 11 as an example, embodiments of the inventive concept are not limited thereto. For example, the above-described structure of the third sensing line TL1c-2 may be applied to remaining sensing lines in the same manner.

According to embodiments of the inventive concept, the display device may include the display panel and the input sensing panel. The input sensing panel may include the sensing line electrically connected to the sensing electrode, and the sensing line may include the transparent conductive line, the metal line, and the insulation layer. The metal line may have the flat top surface. The light incident into the display device from the outside of the display device may be reflected at the top surface of the metal line. Since the top surface of the metal line is flat, the diffused reflection of the incident light may be prevented or substantially prevented from being generated, and the metal line may not be seen from the outside. Thus, the display device having the improved visibility may be provided.

Although some example embodiments of the present invention have been described, it is to be understood that the present invention should not be limited to these example embodiments, but various changes and modifications may be made by one of ordinary skill in the art within the spirit and scope of the present invention as herein claimed. Hence, the protective scope of the present invention shall be determined by the technical scope of the accompanying claims.

What is claimed is:

1. A display device comprising:
a display panel; and
an input sensing panel on the display panel and comprising an active area and a peripheral area adjacent to the active area,
wherein the input sensing panel comprises:
a base layer;
a plurality of sensing electrodes arranged in the active area and on the base layer;
a plurality of sensing lines arranged in the peripheral area, on the base layer, and electrically connected to the plurality of sensing electrodes; and
a plurality of sensing pads arranged in the peripheral area, on the base layer, and electrically connected to the plurality of sensing lines,
each of the plurality of sensing lines comprises:
a transparent conductive line on the base layer;
a metal line directly on the transparent conductive line; and
an insulation layer covering the metal line, and
a plurality of openings are defined in the metal line and the transparent conductive line,
wherein the plurality of openings comprise a plurality of first openings and a plurality of second openings,
the plurality of first openings are defined in the metal line, and
the plurality of second openings are defined in the transparent conductive line and overlap the plurality of first openings on a plane,
wherein a portion of the plurality of sensing lines comprises a first area having a first width and a second area having a second width less than the first width,
a number of the plurality of first openings overlapping the first area is greater than that of the plurality of first openings overlapping the second area, and
a number of the plurality of second openings overlapping the first area is greater than that of the plurality of second openings overlapping the second area.

2. The display device of claim 1, wherein the transparent conductive line extends in a first direction, and
the plurality of second openings are defined in the transparent conductive line, extend in the first direction, and are spaced apart from each other in a second direction crossing the first direction.

3. The display device of claim 2, wherein the metal line overlaps the plurality of openings on a plane.

4. The display device of claim 2, wherein the metal line covers the transparent conductive line.

5. The display device of claim 2, wherein the transparent conductive line comprises a first area having a first width and a second area having a second width less than the first width of the first area of the transparent conductive line, and a number of the plurality of openings defined in the first area of the transparent conductive line is greater than that of the plurality of openings defined in the second area of the transparent conductive line.

6. The display device of claim 1, wherein the transparent conductive line comprises an indium-tin oxide.

7. The display device of claim 1, wherein the metal line comprises molybdenum.

8. The display device of claim 1, wherein the metal line has a thickness greater than that of the transparent conductive line.

9. The display device of claim 1, wherein the plurality of sensing electrodes comprise a first sensing electrode and a second sensing electrode, and
the first sensing electrode comprises a plurality of first sensing patterns and at least one first connection pattern connecting two first sensing patterns, which are adjacent to each other, of the plurality of first sensing patterns, the second sensing electrode comprises a plurality of second sensing patterns and at least one second connection pattern connecting two second sensing patterns, which are adjacent to each other, of the plurality of second sensing patterns, and the first connection pattern and the second connection pattern are on different layers from each other.

10. The display device of claim 9, wherein the input sensing panel further comprises a sensing insulation layer between the first connection pattern and the second connection pattern.

11. The display device of claim 10, wherein the sensing insulation layer is not overlapped with the transparent conductive line.

12. The display device of claim 1, wherein the metal line extends in a first direction, and
the plurality of first openings are defined in the metal line, extend in the first direction, and are spaced apart from each other in a second direction crossing the first direction.

13. The display device of claim 12, wherein the metal line comprises a first area having a first width and a second area having a second width less than the first width of the first area of the metal line, and a number of the plurality of openings defined in the first area of the metal line is greater than that of the plurality of openings defined in the second area of the metal line.

14. The display device of claim 12, wherein the metal line has an area less than that of the transparent conductive line.

15. The display device of claim 12, wherein the metal line has a flat top surface.

16. The display device of claim 12, wherein the transparent conductive line has a maximum width greater than that of the metal line.

17. The display device of claim 1, wherein each of the plurality of first openings has a width greater than that of each of the plurality of second openings.

18. The display device of claim 1, wherein the metal line has an area less than that of the transparent conductive line.

* * * * *